US012800066B2

(12) United States Patent
O'Connor et al.

(10) Patent No.: US 12,800,066 B2
(45) **Date of Patent: *Nov. 17, 2026**

(54) TWISTABLE ROTATION SLEEVE GRIP STRUCTURE FOR GARDEN HOSES

(71) Applicant: Swan Products, LLC, Sandy Springs, GA (US)

(72) Inventors: Tim O'Connor, Eden, NY (US); Jose Rossi, Mississauga (CA); Erick Williams, Roswell, GA (US)

(73) Assignee: Swan Products, LLC, Sandy Springs, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 19/359,452

(22) Filed: Oct. 15, 2025

(65) Prior Publication Data

US 2026/0036225 A1 Feb. 5, 2026

Related U.S. Application Data

(63) Continuation of application No. 18/653,247, filed on May 2, 2024, now Pat. No. 12,460,748.

(51) Int. Cl.
*F16L 3/12* (2006.01)
*F16L 19/02* (2006.01)

(52) U.S. Cl.
CPC ............ *F16L 3/1218* (2013.01); *F16L 19/02* (2013.01)

(58) Field of Classification Search
CPC ... F16L 3/1218; F16L 3/02; F16L 3/12; F16L 3/123; F16L 3/1236; F16L 3/13;
(Continued)

(56) References Cited

U.S. PATENT DOCUMENTS

| | | | |
|---|---|---|---|
| 1,844,023 | A | 2/1932 | Terry |
| 5,197,767 | A | 3/1993 | Kimura |

(Continued)

FOREIGN PATENT DOCUMENTS

| | | | |
|---|---|---|---|
| KR | 2023-0063568 A | 5/2023 | |
| WO | 2021/093978 A1 | 5/2021 | |

OTHER PUBLICATIONS

The International Search Report and Written Opinion of the International Searching Authority dated Jul. 7, 2025 issued in Patent Application No. PCT/US2025/026199 (13 pages).

(Continued)

*Primary Examiner* — David Bochna
(74) *Attorney, Agent, or Firm* — Polsinelli PC

(57) ABSTRACT

A rotation sleeve grip structure for garden hoses or other tubings is provided. A hose assembly can include a hose tubing and a rotation sleeve installed over an outer surface of the hose tubing, where the rotation sleeve is constrained between first and second open ends of the hose tubing and comprises a hollow cylindrical shell configured to enclose a portion of the hose tubing along a longitudinal length. The rotation sleeve is rotatable through 360 degrees about a circumference of the outer surface of the hose tubing. An inner sleeve can be affixed to the outer surface of the hose tubing, and may be disposed between the hose tubing and the rotation sleeve. One or more circumferential rib protrusions and corresponding circumferential channels for receiving the rib protrusions can be provided between the inner sleeve and the rotation sleeve.

19 Claims, 6 Drawing Sheets

(58) Field of Classification Search
CPC . F16L 27/08; F16L 37/53; F16L 57/06; F16L 57/005
USPC .......................................... 285/114, 115, 116
See application file for complete search history.

(56) References Cited

U.S. PATENT DOCUMENTS

| | | | |
|---|---|---|---|
| 5,216,848 | A | 6/1993 | Abbott et al. |
| 5,316,348 | A | 5/1994 | Franklin |
| 5,816,622 | A | 10/1998 | Carter |
| 5,857,711 | A | 1/1999 | Comin-Dumong |
| 6,494,496 | B1 | 12/2002 | Sweeney |
| 7,357,424 | B2 | 4/2008 | Powell |
| 9,625,071 | B2 | 4/2017 | Melo |
| 9,759,359 | B2 | 9/2017 | Papafagos |
| 10,443,762 | B2 | 10/2019 | Van Belkom |
| 12,460,748 | B1 * | 11/2025 | O'Connor ............... F16L 11/12 |
| 2006/0108790 | A1 | 5/2006 | Powell |
| 2006/0186661 | A1 | 8/2006 | Levan |
| 2006/0208110 | A1 | 9/2006 | Guo |
| 2009/0250924 | A1 | 10/2009 | Tisbo |
| 2015/0219259 | A1 | 8/2015 | Weems |

OTHER PUBLICATIONS

Flexzilla, "SwivelGrip Garden & Lead-in Hoses", Weems Industries, Jan. 8, 2024, pp. 1-1, XP093287984, Retrieved from the Internet.

* cited by examiner

TWISTABLE ROTATION SLEEVE GRIP STRUCTURE FOR GARDEN HOSES

CROSS-REFERENCE TO RELATED APPLICATIONS

This application is a continuation of U.S. patent application Ser. No. 18/653,247, filed on May 2, 2024, now U.S. Pat. No. 12,460,748, issued Nov. 4, 2025, and entitled "TWISTABLE ROTATION SLEEVE GRIP STRUCTURE FOR GARDEN HOSES," the contents of which are incorporated herein in their entirety and for all purposes.

TECHNICAL FIELD

The present technology pertains to pipes and hoses, and more specifically to a twistable rotation sleeve grip structure for improved unspooling and/or uncoiling of garden hoses by a user thereof.

BACKGROUND

Garden hoses are commonly used to convey water from a pressurized source (e.g., a spigot, residential hose bib, etc.) to a location away from the source, for various purposes such as watering plants, washing vehicles, cleaning outdoor surfaces, etc. When not in use, garden hoses are often stored by coiling or winding the flexible hose tubing into multiple loops, such that the footprint of the coiled or wound hose is approximately the same as that of a single loop. Various approaches to the coiled or wound storage of garden hoses exist, including stacking or piling the loops of hose in place on the ground, winding the loops of hose around a reel, hanging the loops of hose from a hanger, etc. Coiling or winding the length of the hose allows the hose to be compacted into a smaller space or volume for neater storage or organization.

Coiling a garden hose often introduces twists and kinks into the hose tubing, for example based on each loop of the coiled hose being rotationally offset from the previous loop(s) in order for the hose to wind into a relatively tight coil. The cumulative effect of these relatively small rotational offsets between loops can be a relatively large torsional stress and/or tension that builds along the longitudinal length of the hose. This accumulated tension can cause kinking and other challenges when an individual or user later tries to unwind the coiled garden hose.

For example, as the user pulls on the free end of the coiled hose in order to unwind it, the coiled portion of the hose may rapidly unloop and release the stored rotational tension, which can result in the hose aggressively twisting and/or kinking as it unwinds. In addition to kinking, this rapid uncoiling and associated twisting action of the hose can often cause the hose to become tangled, snagged, etc. The challenges associated with kinking, twisting, and/or tangling can make unwinding a coiled garden hose (or other flexible tubing) a cumbersome and frustrating task. The hose may become difficult to control and any kinks may restrict or prevent the flow of water through the hose. Attempting to force a kinked or tangled hose to straighten out can cause damage or accelerated wear of the hose tubing. There is a need for systems and techniques that can be used to allow a coiled garden hose to be unwound in a steady and controlled manner while also preventing the hose from excessively twisting, kinking, and/or tangling in the process.

SUMMARY

In one illustrative example, provided is a hose assembly comprising: a hose tubing having first and second open ends; and a rotation sleeve installed over an outer surface of the hose tubing, wherein the rotation sleeve is constrained between at least the first and second open ends of the hose tubing and comprises a hollow cylindrical shell configured to enclose a portion of the hose tubing along a longitudinal length thereof, and wherein the rotation sleeve is rotatable through 360 degrees about a circumference of the outer surface of the hose tubing.

In some aspects, the hose assembly further comprises an inner sleeve disposed between the outer surface of the hose tubing and an interior surface of the rotation sleeve, wherein the inner sleeve is attached to a corresponding portion of the outer surface of the hose tubing along the longitudinal length.

In a further aspect, the inner sleeve is rigidly coupled or bonded to the corresponding portion of the outer surface of the hose tubing, and wherein the rotation sleeve is rotatable through 360 degrees relative to the inner sleeve and the hose tubing.

In a further aspect, the inner sleeve includes one or more retention tabs spaced about a circumference of an outer surface of the inner sleeve, each respective retention tab of the one or more retention tabs including a radial protrusion at a distal end of the respective retention tab; and the rotation sleeve includes a circumferential channel configured to receive the radial protrusion of each respective retention tab of the one or more retention tabs to longitudinally constrain movement of the rotation sleeve relative to the inner sleeve, wherein the circumferential channel is recessed from an interior surface of the rotation sleeve.

In a further aspect, the rotation sleeve is rotatable through 360 degrees based on travel of the radial protrusion of each respective retention tab of the one or more retention tabs within the circumferential channel of the interior surface of the rotation sleeve.

In a further aspect, the inner sleeve includes a plurality of circumferential rib protrusions each extending from an outer surface of the inner sleeve.

In a further aspect, the inner sleeve includes a recessed circumferential channel recessed from the outer surface of the inner sleeve, wherein a width of the recessed circumferential channel is greater than a width associated with each circumferential rib protrusion of the plurality of circumferential rib protrusions, and wherein the recessed circumferential channel is configured to receive a corresponding circumferential protrusion extending from an interior surface of the rotation sleeve.

In a further aspect, the rotation sleeve is coupled to the inner sleeve and constrained from movement in a longitudinal direction based on the circumferential protrusion of the rotation sleeve interior surface being received within the recessed circumferential channel of the inner sleeve.

In a further aspect, the rotation sleeve is rotatable through 360 degrees relative to the inner sleeve and the hose tubing based on the circumferential protrusion being received within the recessed circumferential channel.

In a further aspect, a surface area of a contact patch between the outer surface of the inner sleeve, and the interior surface of the rotation sleeve corresponds to a combined area of the plurality of circumferential rib protrusions.

In a further aspect, the inner sleeve further includes a reference protrusion extending from the outer surface along a circumference of the inner sleeve; and the reference protrusion is located at a longitudinal location configured to align the inner sleeve relative to the rotation sleeve based on the reference protrusion being received within a corresponding channel on the interior surface of the rotation sleeve.

In a further aspect, the recessed circumferential channel of the inner sleeve is located between first and second circumferential rib protrusions included in the plurality of circumferential rib protrusions.

In a further aspect, an inner diameter (ID) of the inner sleeve is greater than or equal to an outer diameter (OD) of the hose tubing; and a second ID of the rotation sleeve is greater than or equal to a second OD of the inner sleeve.

In a further aspect, the rotation sleeve comprises: a base layer forming the hollow cylindrical shell configured to enclose the portion of the hose tubing; and an overmolded layer disposed on an outer surface of at least a portion of the base layer, wherein the overmolded layer comprises a thermoplastic rubber (TPR) material or a soft-touch overmold material.

In a further aspect, the base layer of the rotation sleeve comprises polypropylene.

In a further aspect, the rotation sleeve comprises a grip structure configured with one or more grip elements for handheld use of the hose assembly by a user.

In a further aspect, the rotation sleeve further includes one or more handles coupled to and extending from an outer surface of the hollow cylindrical shell of the rotation sleeve.

In a further aspect, the hose tubing comprises a segment of hose tubing having a first length between a male coupling provided at the first open end and a female coupling provided at the second open end; the rotation sleeve is installed over an outer surface of the segment of hose tubing and longitudinally constrained between the male coupling and the female coupling; and the hose assembly further includes a second length of hose tubing attached to the segment of hose tubing using one of the male coupling or the female coupling of the segment of hose tubing.

In a further aspect, the second length of hose tubing is longer than the first length of the segment of hose tubing.

In a further aspect, the first length is less than 12 inches, and wherein the second length is greater than 20 feet.

In a further aspect, the rotation sleeve has a circular cross section and comprises a first portion and a second portion detachably coupled along a longitudinal length of the rotation sleeve; and the first portion and the second portion of the rotation sleeve each have a respective semi-circular cross section, where a semi-circular cross-sectional area of the first portion is equal to a semi-circular cross-sectional area of the second portion.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
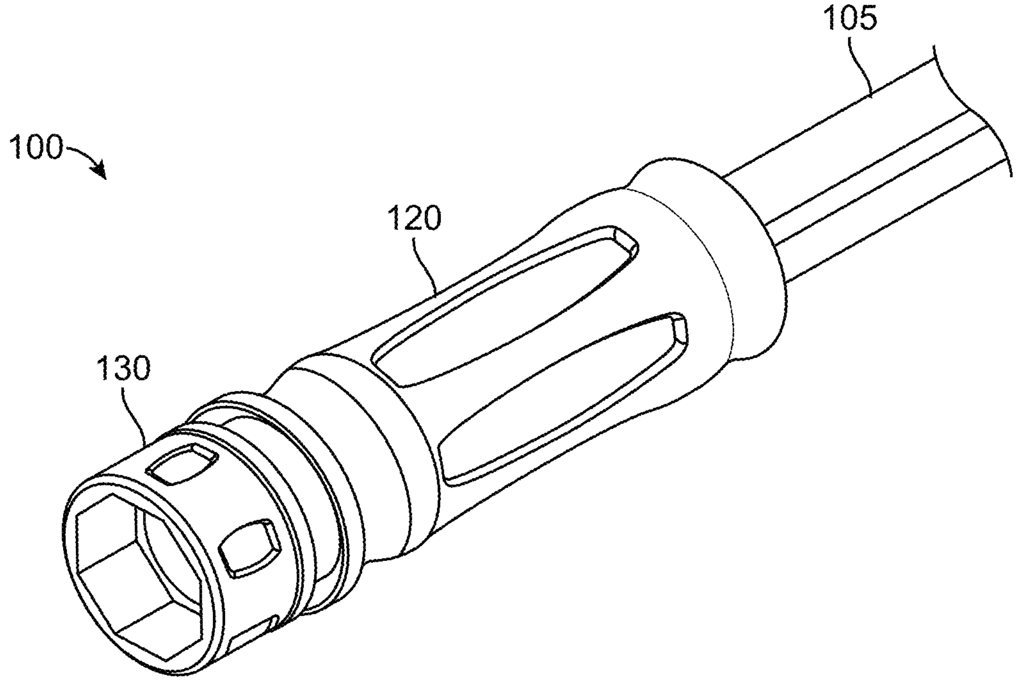
FIG. 1 illustrates a perspective view of a hose assembly including a twistable rotation sleeve grip structure installed thereupon, in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Additional features and advantages of the disclosure will be set forth in the description which follows, and in part will be obvious from the description, or can be learned by practice of the herein disclosed principles.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale, and the proportions of certain parts may be exaggerated to better illustrate details and features. The description is not to be considered as limiting the scope of the embodiments described herein.

FIG. 1 illustrates a perspective view of a hose assembly 100 including a twistable rotation sleeve grip structure 120 installed thereupon, in accordance with some examples. In one illustrative example, the rotation sleeve grip structure 120 can be installed upon or about an outer surface of a hose 105 (e.g., such as a garden hose or other flexible tubing used to convey pressurized and/or un-pressurized fluids, etc.). The rotation sleeve grip structure 120 may also be referred to herein as a "rotation sleeve" and/or "rotatable grip," and can be configured with complete or partial rotational freedom about the circumference of the hose 105 upon which the rotation sleeve 120 is installed.

The hose 105 can be any garden hose or other flexible tubing, as noted above. For example, the hose 105 can have various material compositions, layers, dimensions (e.g., internal diameter (ID), outer diameter (OD)), etc. Throughout the following description, reference may be made to a "hose" or a "tubing," with it being understood that the terms may be used interchangeably herein. The hose 105 can be provided as a single-layer construction or a multi-layer construction. The hose 105 can comprise various materials, or various combinations of multiple materials, which can include one or more of polyvinyl chloride (PVC), thermoplastic elastomer (TPE), thermoplastic polyurethane (TPU), nylon, polyethylene (PE), synthetic rubber(s), natural rubber(s), etc., among various others. The choice of a specific material may be driven by parameters such as cost, durability, weather resistance, pressure requirements, or any other such parameters.

The rotation sleeve 120 can have a minimum ID that is greater than the OD of the hose tubing 105 upon which the rotation sleeve 120 will be installed and used. The ID of the rotation sleeve 120 can define a cylindrical internal volume between the distal open ends of the rotation sleeve 120, where the open ends of the rotation sleeve 120 are aligned along a longitudinal axis of the rotation sleeve 120. The rotation sleeve 120 can be installed onto the hose assembly 100 of FIG. 1 based on inserting the hose tubing 105 into the cylindrical internal volume of the rotation sleeve 120 (e.g., with the insertion performed along the longitudinal axis of the rotation sleeve 120, which can be the same as and/or parallel to the longitudinal axis of the hose tubing 105 when installation of the rotation sleeve 120 is complete).

One or more rotation mechanisms can be provided at the interface between the rotation sleeve 120 and the hose tubing 105 upon which the rotation sleeve 120 is installed. In some embodiments, an inner sleeve 130 can be installed directly upon the outer surface of the hose tubing 105, with the rotation sleeve grip structure 120 subsequently installed over (e.g., about, around, etc.) the inner sleeve 130. The inner sleeve 130 can include the one or more rotation mechanisms or engageable rotation guides configured to provide the rotation sleeve 120 with rotation freedom about the hose tubing 105 and the inner sleeve 130 (e.g., with the inner sleeve 130 rigidly coupled or affixed to the hose tubing 105, without any rotation freedom therebetween). Further details and examples of the inner sleeve and rotation mechanism structures will be provided below with respect to FIGS. 2A-6C.

As noted previously, the rotation sleeve grip structure 120 can be utilized to allow the garden hose or tubing 105 to spin (e.g., rotate) while uncoiling. For example, the rotation sleeve grip structure 120 can be installed at or near the open end of the hose tubing 105, below the end coupler and/or nozzle where water or other fluids are designed to exit the hose tubing 105 under the control or direction of the user. It is noted that the example hose assembly 100 of FIG. 1 does not depict the hose-end male or female coupler at the far end of the hose assembly 100. In other words, the inner sleeve 130 is provided as a separate structure from any hose-end ferrule or other fitting that may be used to terminate the open end of the garden hose tubing 105 (e.g., although not shown in FIG. 1, the garden hose tubing 105 extends an additional length to the left, through and beyond the open end of the inner sleeve 130). An example of this configuration can be seen in the various views of FIGS. 3A-3C, which depict a rotation sleeve grip structure 320 installed over an inner sleeve 330 that is coupled to the outer surface of a garden hose tubing 305/307. The garden hose tubing 305/307 passes through the open distal end of the rotation sleeve grip structure 320, and emerges through the opposite, open distal end of the inner sleeve 330. A hose end connector 302 (e.g., a male coupler or threaded male fitting, etc.) attached to the end of the garden hose tubing 305/307 extends beyond the inner sleeve 330, and the inner sleeve 330 is installed at a longitudinal length or location along the garden hose tubing 305/307 such that the inner sleeve 330 terminates at or before the hose end fitting 302.

Returning to the example of FIG. 1, the rotation sleeve grip structure 120 can be configured to be held or otherwise controlled by a user of the garden hose 105 and hose assembly 100. For example, the rotation sleeve grip structure 120 can be sized for hand-held use or operation by the user, with one or more grip-enhancing or other ergonomic features provided by the exterior surface of the rotation sleeve grip structure 120 (e.g., one or more molded ribs or grip elements running along the longitudinal length or axis of the rotation sleeve 120, etc.). During operation, the rotation sleeve grip structure 120 is held in the user's hand, such that the user's hand and the rotation sleeve grip structure 120 do not rotate relative to one another (e.g., the rotation sleeve 120 is held by the user in a fixed grip or position, without rotational freedom therebetween). The rotation sleeve grip structure 120 is installed onto the garden hose tubing 105 such that the rotation sleeve can freely rotate with respect to the garden hose tubing 105, and vice versa. In particular, the inner sleeve 130 can be rigidly attached or coupled to the exterior of the garden hose tubing 105, and the rotation sleeve grip structure 120 can rotate freely through 360-degrees with respect to the combination of the inner sleeve 130 and garden hose tubing 105.

Accordingly, the rotation sleeve grip structure 120 can provide a stable and fixed platform by which a user can hold and control the hose assembly 100, while the hose tubing 105 is free to rotate or spin. Advantageously, decoupling the rotation sleeve grip structure 120 from the hose tubing 105 can be seen to additionally decouple the rotation sleeve grip structure 120 (and the user's hand/arm) from the twisting or bending forces that can be associated with the twisting or spinning action of the hose tubing 105, particularly during uncoiling of the hose tubing 105.

For example, in the absence of the rotation sleeve grip structure 120 (e.g., the user grasps the outer surface of the hose tubing 105 directly), the twisting forces associated with uncoiling the hose 105 cannot be released through the relative rotation of the hose 105 with respect to the user's hand. These twisting forces instead accumulate in and along the length of the hose tubing 105, which can cause kinking, twisting, and/or tangling of the hose 105 as the user continues to uncoil or unspool the hose. In some cases, the user uncoiling a hose without the rotation sleeve grip structure 120 may resort to repeatedly letting go of the hose in order to release the twisting forces and accumulated tension. Repeatedly releasing hold of the hose can be inconvenient and time consuming. Additionally, when the free end of the hose is no longer being held by the user, it may twist or swing uncontrollably, which can present a hazard and/or can result in the free end of the hose coming to rest away from the user (e.g., forcing the user to walk over to the location of the free end of the hose laying on the ground, pick up the hose, and repeat/begin the process anew).

Accordingly, there is a need for systems and techniques that can be used to provide improved efficiency and ease of use during the uncoiling of a garden hose or other flexible tubing that is coiled into a plurality of loops.

Figure 2A:
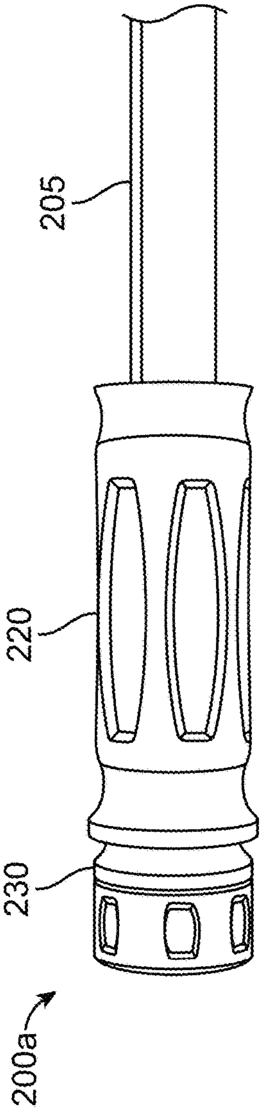
FIGS. 2A-2C depict side views of an example hose assembly including an outer rotation sleeve grip structure and an inner coupling sleeve, in accordance with some examples.
Figure 2B:
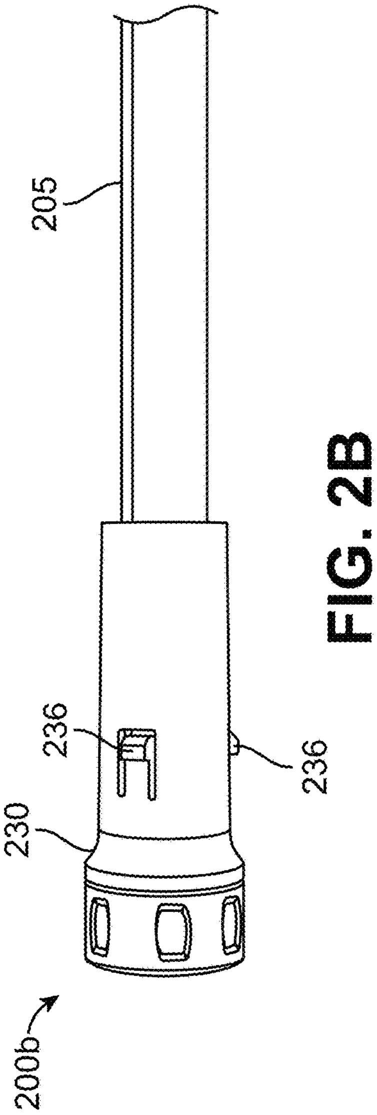
Figure 2C:
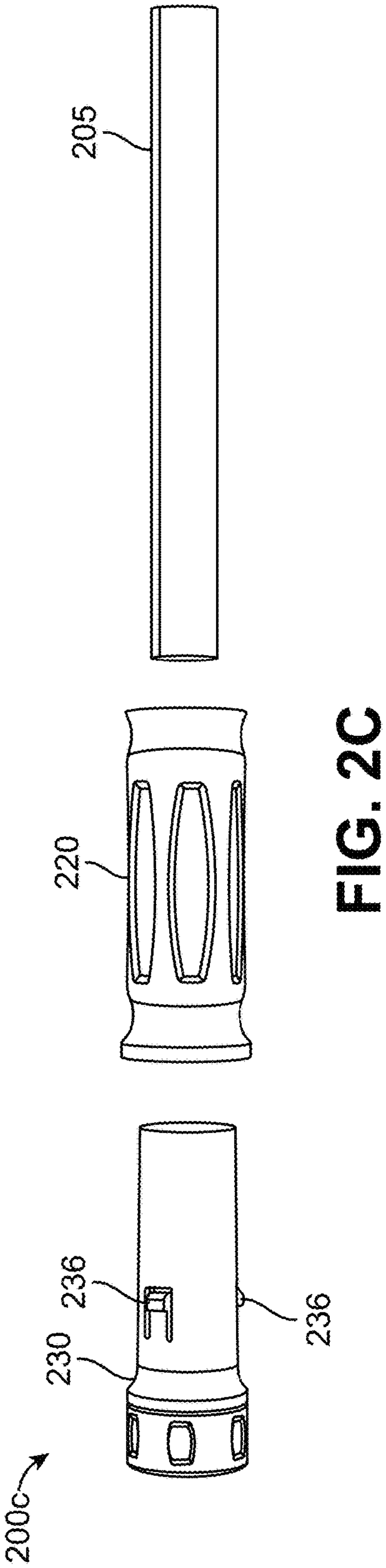

FIGS. 2A-2C depict side views of an example hose assembly including an outer rotation sleeve grip structure and an inner coupling sleeve, in accordance with some examples. In one illustrative example, the various side views 200*a*-200*c* of FIGS. 2A-2C (respectively) can correspond to the perspective view of the hose assembly 100 shown in FIG. 1. For instance, FIG. 2A depicts a view 200*a* of a hose assembly comprising a hose tubing 205, a rotation sleeve grip structure 220, and an inner rotation sleeve 230 provided between the outer surface of the hose tubing 205 and the inner surface of the rotation sleeve grip structure 220. FIG. 2B depicts a view 200*b* of the hose assembly of FIG. 2A, without the outer rotation sleeve grip structure 220 (e.g., with the rotation sleeve grip structure 220 removed, and the inner rotation sleeve 230 exposed). FIG. 2C depicts an exploded view 200*c* of the hose assembly shown in FIG. 2A and FIG. 2B, e.g., illustrating the hose tubing 205 of FIGS. 2A-2B, the outer rotation sleeve grip structure 220 of FIG. 2A, and the inner rotation sleeve 230 of FIGS. 2A-2B. In some aspects, the hose tubing 205 of FIGS. 2A-2C can be the same as or similar to the hose tubing 105 of FIG. 1. The rotation sleeve grip structure 220 shown in FIGS. 2A and 2C can be the same as or similar to the rotation sleeve grip structure 120 shown in FIG. 1. The inner rotation sleeve 230 of FIGS. 2A-2C can be the same as or similar to the inner rotation sleeve 130 of FIG. 1.

The inner rotation sleeve 230 can be installed over and/or about the outer surface of the hose tubing 205. For example, the inner rotation sleeve 230 can be installed to make direct contact with the outer surface of the hose tubing 205. In some examples, the inner rotation sleeve 230 may be press-fit or friction-fit onto the outer surface of the hose tubing 205. In some aspects, a layer of glue or adhesive can be used to couple or otherwise affix the inner rotation sleeve 230 to the outer surface of the hose tubing 205. The installation of the inner rotation sleeve 230 onto the outer surface of the hose tubing 205 can be permanent, semi-permanent, and/or user-removable.

In some cases, the inner rotation sleeve 230 can be installed onto the hose tubing 205 at the time of manufacture. For example, the inner rotation sleeve 230 can be installed over the hose tubing 205, prior to the ferrule and/or coupling (e.g., male or female threaded fitting, etc.) being installed onto the distal, open end of the hose. For instance, with respect to FIGS. 3A-3C, the inner rotation sleeve 330 may be the same as or similar to the inner rotation sleeve 230 of FIGS. 2A-2C, and can be installed onto the hose tubing 305 during the time of manufacture. After installing the inner rotation sleeve 330 over the outer surface of the hose tubing 305, the threaded connector 302 can subsequently be fitted within or otherwise installed upon the distal end of the hose tubing 305 (e.g., the hose tubing 305 distal end that extends through and beyond the inner rotation sleeve 330). In some cases, the installation of the connector 302 onto the hose tubing 305 can prevent the removal of the inner rotation sleeve 330. For example, the OD of the hose tubing 305 can be less than the ID of the inner rotation sleeve 330, such that (in the absence of the end fitting 302) the inner rotation sleeve 330 can be slipped on and off of the hose tubing 305. The ODF of the end fitting 302 can be greater than the OD of the hose tubing 305, and can additionally be greater than the ID of the inner rotation sleeve 330, such that the end fitting 302 prevents the inner rotation sleeve 330 from sliding off the end of the hose tubing 305.

Returning to the discussion of FIGS. 2A-2C, the inner rotation sleeve 230 can include one or more rotation mechanisms or rotation guides (e.g., rotation elements) configured to provide the 360-degrees of rotational freedom between the outer rotation sleeve grip structure 220 and the hose tubing 205 (e.g., based at least in part on the hose tubing 205 being rigidly affixed to the inner rotation sleeve 230, as noted previously).

In one illustrative example, the inner rotation sleeve 230 can include a rotation mechanism or rotation guide (e.g., rotation element(s)) comprising a plurality of retention tabs 236 extending radially outward from the outer surface of the inner rotation sleeve 230 (e.g., as depicted in FIGS. 2B and 2C). In some aspects, the plurality of retention tabs 236 can be integrally molded or integrally formed with the inner rotation sleeve 230, and can be disposed about a circumference of the inner rotation sleeve 230. For example, in some embodiments the plurality of retention tabs 236 can be located on or along the same circumferential portion of the inner rotation sleeve 230, such that each retention tab 236 is located at the same longitudinal length of the inner rotation sleeve 230 (e.g., the longitudinal distance between each retention tab 236 and the open distal end of the inner rotation sleeve 230 is the same). In some examples, a first portion of the plurality of retention tabs 236 may be located at a first longitudinal distance from the open distal end of the inner rotation sleeve 230 (e.g., located along a first circumference of the inner rotation sleeve 230), and a second portion of the plurality of retention tabs 236 can be located at a second longitudinal distance from the open distal end of the inner rotation sleeve 230 (e.g., located along a second circumference of the inner rotation sleeve 230). In some aspects, each retention tab of the plurality of retention tabs 236 can be the same as one another (e.g., can have the same shape, size, dimensions, geometry, etc.). The plurality of retention tabs 236 may be equally spaced about the circumference of the inner rotation sleeve 230 such that the distance between adjacent pairs of retention tabs 236 is the same. In some examples, the plurality of retention tabs 236 can be provided with variable spacing about the circumference of the inner rotation sleeve 230 (e.g., the distance between various adjacent pairs of retention tabs 236 can be different, can vary, etc.).

The retention tabs 236 can be cantilevered in the longitudinal direction or axis along the inner rotation sleeve 230. For example, each retention tab 236 can be attached to or integrally formed with the inner rotation sleeve 230, at a first end of the retention tab 236. The second, opposite end of each retention tab 236 can be free floating and/or otherwise un-attached or uncoupled to the structure of the inner rotation sleeve 230. For example, in the side views shown in FIGS. 2B and 2C, the retention tabs 236 are attached to the inner rotation sleeve 230 at the left end of the retention tab 236, and are free-floating or un-attached at the right end of the retention tab 236. The cantilevered design of the retention tabs 236 can allow the retention tab to flex or elastically deform, with the deflection of the retention tab 236 along its longitudinal length corresponding to an increase or a decrease in the extent to which the retention tab 236 protrudes radially from the surface of the inner rotation sleeve 230.

In particular, the radial protrusion of the retention tab 236 can be located at the second, free-floating or un-attached end of the retention tab 236 (e.g., the right end, in the view of FIGS. 2B and 2C). The radial protrusion of each retention tab 236 can be configured to engage with or within a corresponding circumferential channel located on the inner surface of the rotation sleeve grip structure 220. The circumferential channel of the rotation sleeve grip structure 220 can be sized to receive the radial protrusion of each retention tab 236, and can be a continuous channel that is recessed from the inner surface of the rotation sleeve grip structure 220. Based on the engagement and containment of the inner rotation sleeve 230 retention tabs 236 within the corresponding circumferential channel of the rotation sleeve grip structure 220, the rotation sleeve grip structure 220 can be rotatably coupled to the inner rotation sleeve 230. For example, seating the retention tabs 236 within the interior circumferential channel of the rotation sleeve grip structure 220 can constrain or prevent relative longitudinal movement between the inner rotation sleeve 230 and the outer rotation sleeve grip structure 220 (e.g., the inner rotation sleeve 230 and the outer rotation sleeve grip structure 220 can be coupled in the longitudinal direction by the engagement between the plurality of retention tabs 236 on the inner rotation sleeve 230 and the corresponding circumferential channel on the inner surface of the rotation sleeve grip structure 220.

Figure 4A:
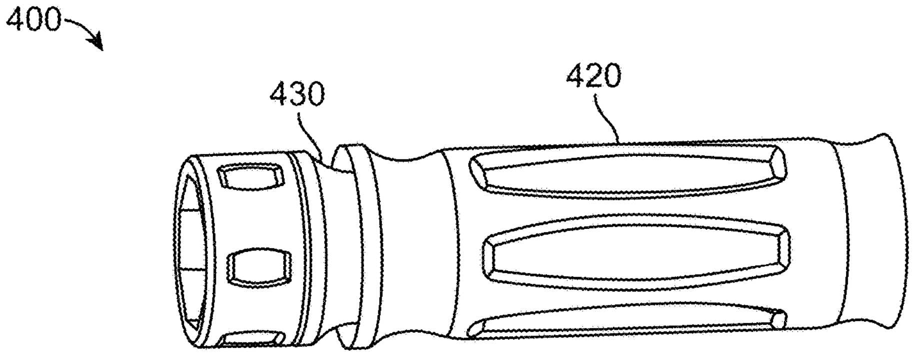
FIGS. 4A-4C depict exploded and cross-sectional views of an example rotation sleeve grip structure comprising an inner sleeve with one or more retention tabs and an outer rotation sleeve including a circumferential channel adapted to receive the one or more retention tabs, in accordance with some examples.
Figure 4B:
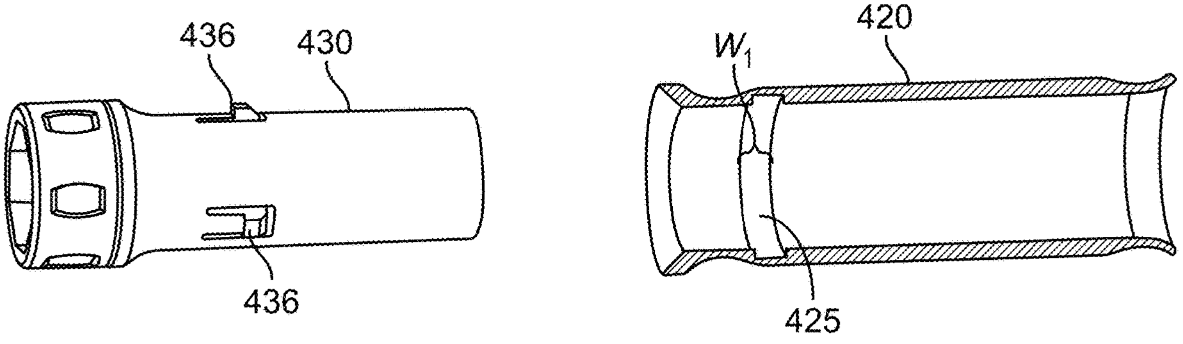
Figure 4C:
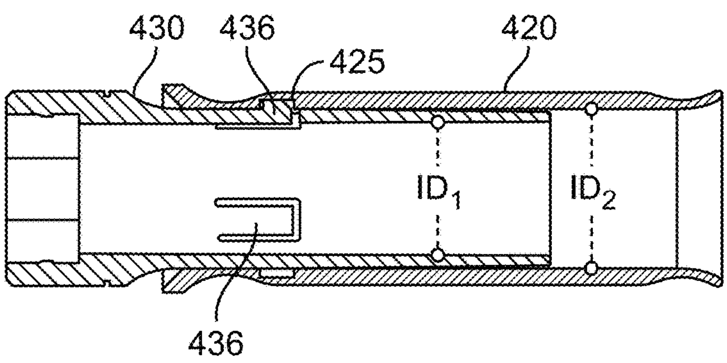

An example of the rotation mechanism formed based on the plurality of retention tabs 236 being received in the corresponding circumferential channel of the rotation sleeve grip structure 220 is depicted in FIGS. 4A-4C. In particular, FIGS. 4A-4C depict exploded and cross-sectional views of an example rotation sleeve grip structure comprising an inner sleeve 430 with one or more retention tabs 436, and an outer rotation sleeve 420 including a circumferential channel 425 that is adapted to receive the one or more retention tabs 436, in accordance with some examples.

Figure 3C:
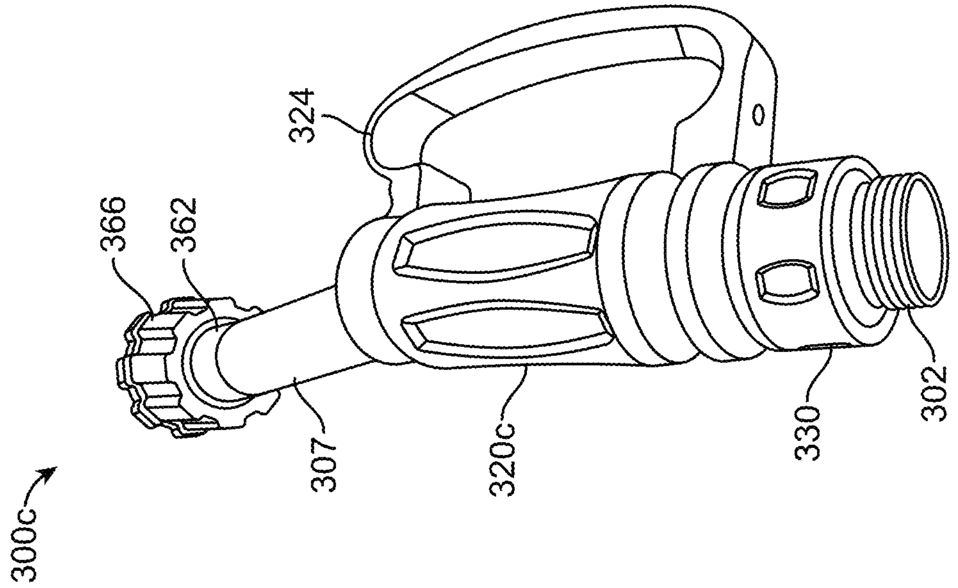
FIG. 3C illustrates an example rotation sleeve grip structure including an ergonomic user grip enhancement comprising a handle, in accordance with some examples.
Figure 3B:
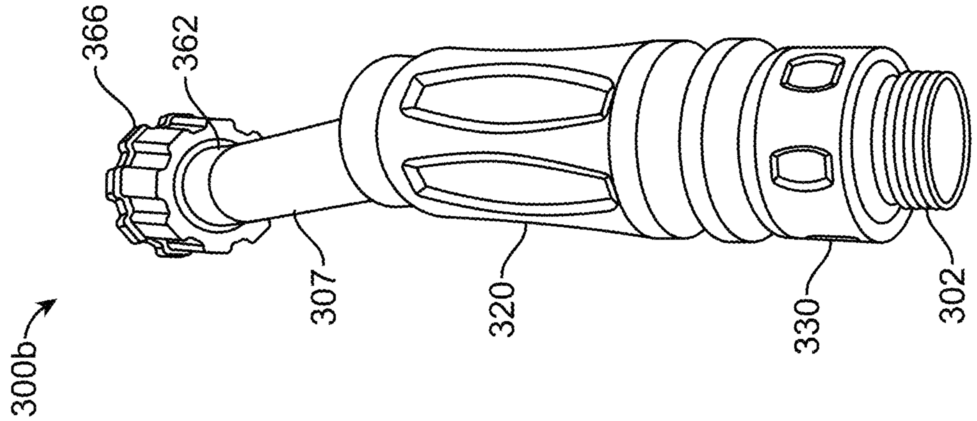
FIG. 3B illustrates an example rotation sleeve grip structure installed upon a segment of garden hose or tubing that can be used for attachment to a larger length of garden hose or tubing, in accordance with some examples.
Figure 3A:
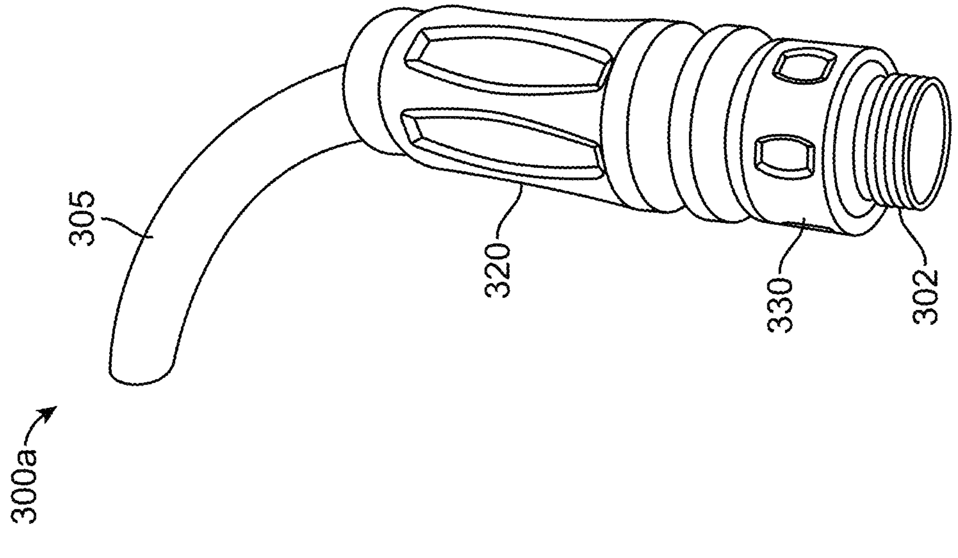
FIG. 3A illustrates an example rotation sleeve grip structure installed upon a garden hose or tubing, in accordance with some examples.

In some aspects, the outer rotation sleeve 420 depicted in FIGS. 4A-4C can be the same as or similar to the outer rotation sleeve 120 of FIG. 1, the outer rotation sleeve 220 of FIGS. 2A-2C, the outer rotation sleeve 320/320*c* of FIGS. 3A-3C, etc. The inner rotation sleeve 430 of FIGS. 4A-4C can be the same as or similar to the inner rotation sleeve 130 of FIG. 1, the inner rotation sleeve 230 of FIGS. 2A-2C, the inner rotation sleeve 330 of FIGS. 3A-3C, etc. As noted above, the inner rotation sleeve 430 of FIGS. 4A-4C can include a plurality of retention tabs 436 that may be the same as or similar to the plurality of retention tabs 236 of FIGS. 2A-2C.

FIG. 4A depicts the rotation assembly 400 comprising the inner rotation sleeve 430 inserted with the cylindrical interior volume of the rotation sleeve grip structure 420. FIG. 4B illustrates the inner rotation sleeve 430, and a cross-sectional view of the outer rotation sleeve grip structure 420. In particular, the cross-sectional view of FIG. 4B depicts the inner circumferential channel 425 provided on the interior surface of the rotation sleeve grip structure 420. In one illustrative example, the circumferential channel 425 can have a width $W_1$ corresponding to the size of the radial protrusions located at the distal end of each retention tab 436 of the plurality of retention tabs 436 provided about the circumference of the inner sleeve 430. For example, the width $W_1$ of the circumferential channel 425 can be slightly larger than the width (measured along the longitudinal axis) of the radial protrusion on each retention tab 436, such that the retention tab 436 can be received within the circumferential channel 425 (which is itself recessed from the inner surface or wall of the rotation sleeve grip structure 425) while also being constrained from relative movement out of or within the channel 425 in the longitudinal direction.

While FIG. 4B depicts the inner sleeve 430 and the outer rotation sleeve grip structure 420 as separate (e.g., detached) components, the cross-sectional view of FIG. 4C illustrates the rotatable coupling or rotation mechanism formed between the inner sleeve 430 and the outer rotation sleeve grip structure 420. As illustrated, the inner sleeve 430 can have an inner diameter $ID_1$ that is less than an inner diameter $ID_2$ of the outer rotation sleeve grip structure 420. Based on the difference in inner diameters (e.g., $ID_2>ID_1$), the inner sleeve 430 can be installed within the interior volume between the two open ends of the outer rotation sleeve grip structure 420. Although not shown for simplicity in the view of FIG. 4C, a garden hose or other tubing (e.g., such as the hose 105 of FIG. 1, the hose 205 of FIGS. 2A-2B, the hose 305/307 of FIGS. 3A-3C, etc.) can be provided within the interior of the inner sleeve 430 and can be attached to the interior surface or wall of the inner sleeve 430. For example, the outer diameter of the hose can be less than or equal to $ID_1$, the inner diameter of the inner sleeve 430.

The radial protrusion located at the far end of each retention tab 436 can be seen in the cross-sectional view of FIG. 4C, where the radial protrusion extends outwardly away from the walls of the inner sleeve 436 and is received within the recessed circumferential channel 425 of the inner surface of the rotation sleeve grip structure 420. The alignment of the retention tabs 436 with the recessed circumferential channel 425 can be used to prevent longitudinal movement between the rotation sleeve grip structure 420 and the inner sleeve 430 (and the garden hose or tubing affixed to the inner sleeve 430).

The recessed circumferential channel 425 can be a continuous channel that permits the movement of the retention tabs 436 along the circumferential channel 425. For example, the movement of the retention tabs 436 along or through the circumferential channel 425 can correspond to relative rotation between the rotation sleeve structure 420 and the inner sleeve 430. In the absence of biasing or restoring forces, the inner sleeve 430 can spin or rotate freely within the rotation sleeve grip structure 420, thereby enabling the rotating or spinning motion of a garden hose to which the inner sleeve 430 is affixed, while the rotation sleeve grip structure 420 is held stationary in a user's hand (e.g., while uncoiling the garden hose, etc.).

It is noted that various other configurations of the rotation mechanism or rotatable coupling between the inner sleeve and outer rotation grip structure can be utilized, without departing from the scope of the disclosure. For example, a greater or lesser number of retention tabs can be utilized on the inner sleeve, a different arrangement or pattern of retention tabs can be utilized on the inner sleeve, different sizes and/or geometries of the recessed circumferential channel can be provided on the outer rotation sleeve grip structure, etc. In some aspects, one or more O-rings can be provided adjacent to or within the recessed circumferential channel 425 of the outer rotation grip structure 420. For example, a first O-ring may be provided at the boundary between the inner wall of the rotation grip structure 420 and the left-most edge of the circumferential channel 425. A second O-ring may be provided at the boundary between the right-most edge of the circumferential channel 425 and the inner wall of the rotation grip structure 420. In some examples, both the first and the second O-rings may be included. Various other rotation mechanism and rotatable couplings between an inner sleeve and outer rotation grip structure will be described below with respect to FIGS. 5A-6C.

In some embodiments, the outer rotation grip structure 420 can be installed over an inner sleeve without retention tabs. For example, in some embodiments, the inner sleeve 430 can be provided in a configuration without the plurality of retention tabs 436. In such examples, the outer rotation grip structure 420 can move, translate, etc., in the longitudinal direction relative to the inner sleeve 430. In some cases, the outer rotation grip structure 420 and the inner sleeve 430 (e.g., in examples without the retention tabs 436) can be longitudinally unconstrained with respect to one another, but may be secured onto the garden hose between the hose end fitting, which may be sized with an OD greater than the inner sleeve 430 ID and the outer grip structure 420 ID, such that the inner sleeve 430 and outer grip structure 420 cannot slide off the free end of the hose (e.g., cannot slide over the hose end fitting and off the hose tubing entirely).

In some embodiments, a collar, clamp, band, flange, etc., may be installed on the outer surface of the hose to define a second longitudinal location that the inner sleeve and outer grip structure are unable to slide over. For example, a collar or clamp can be installed at a second longitudinal location along the length of the hose outer surface, away from the hose end fitting and beyond the second distal end of the outer grip structure 420 (e.g., to the right of the outer grip structure 420, in the perspective of FIGS. 4A-4C). The collar or other retention structure can be rigidly affixed or otherwise attached to the outer surface of the hose, such that the increase in diameter at the location of the collar or retention structure prevents the inner sleeve 430 or the outer grip structure 420 from passing over the collar/retention structure and being moved farther down the hose. In some aspects, one or more collars can be used to position and/or reposition the outer grip structure 420 and/or inner sleeve 430 at any desired location along the longitudinal length of the hose, based on the outer grip structure 420 and inner sleeve 430 being constrained to be within or between a pair of collars that can be re-located as desired along the length of the hose tubing.

In other examples, the outer grip structure 420 can be configured to slide off of the inner sleeve 430 (e.g., in examples where the inner sleeve 430 does not include the retention tabs 436 or other couplers for attaching to the outer grip structure 420 and constraining the longitudinal movement thereof), while the inner sleeve 430 is attached to the hose outer surface at the free end of the hose (e.g., at or adjacent to the hose end fitting). In such examples, the outer grip structure 420 can be constrained between the two hose end fittings provided on the hose, with the outer grip structure 420 moveable to any longitudinal location along the length of the hose between the two hose end fittings. In some aspects, a moveable or repositionable outer grip structure 420 can be slid over the inner sleeve 430 at the free end of the hose and may be used as described previously. The moveable or repositionable outer grip structure 420 may also be repositioned to a different longitudinal location along the length of the hose, for example at or near the middle of the hose (away from the inner sleeve 430 at the fitting or coupler end of the hose) and can be held in place by the user while the hose tubing rotates within the interior of the outer grip structure 420.

As mentioned previously, in some embodiments the outer grip structure (and associated inner sleeve, when present) can be installed onto a garden hose or tubing at the time of manufacture, for instance prior to the installation of the hose end fittings or threaded couplers. FIG. 3A illustrates an example 300*a* of a rotation sleeve grip structure 320 installed upon a garden hose or tubing 305. For example, the inner sleeve 330 and outer rotation sleeve grip structure 320 of FIG. 3A can be installed over the outer surface of the full length of a garden hose or tubing 305, prior to the installation of the threaded end fitting 302 (which can be sized to prevent the removal of the inner sleeve 330 or outer rotation sleeve grip structure 320 by sliding off of the hose tubing 305).

In some examples, the disclosed rotation sleeve grip can be installed on a segment of garden hose or tubing with a relatively short length (e.g., 6", 12", 18", etc.), where the hose segment is configured to attach to and thereby extend from the end of an existing garden hose. For instance, FIG. 3B illustrates an example 300*b* of a rotation sleeve grip structure 320 and inner sleeve 330 that are installed over a relatively short garden hose segment 307, that can be attached to a user's existing hoses or otherwise used to retrofit the rotation sleeve grip onto existing hoses (e.g., used for the installation of the rotation sleeve grip into a hose assembly after the time of manufacture).

The example 300*b* can comprise a segment or length of garden hose tubing 307 extending between a first end 362 and a second end associated with the threaded coupler 302. In some aspects, the rotation sleeve grip segment 300*b* of garden hose tubing can be configured for attachment to a threaded male coupler or fitting provided at the free end of a user's existing garden hose. The standardization of the threaded male coupler or fitting can ensure compatibility with existing garden hoses of various different dimensions, compositions, designs, and manufacture, etc.

The rotation sleeve grip assembly segment 300*b* can include a rotatable coupler 366 provided at the first end 362, configured to attach to a user's existing garden hose while permitting free rotation through a 360-degree range. For example, the rotatable coupler 366 can be a female-threaded coupler configured for attachment with a corresponding male-threaded fitting at the free end of the user's existing garden hose. The attachment between the rotatable coupler 366 and the first end 362 of the garden hose segment 307 can include a rotation mechanism to allow the hose segment 307 to rotate relative to the coupler 366 and the user's existing garden hose attached to the coupler 366.

In some embodiments, the coupler 366 can be a rigid and/or non-rotatable female-threaded coupling, such that the user's existing garden hose and the hose extension segment 307 move as a single or combined body. In some embodiments, the garden hose segment 307 and rotation sleeve grip structure 320 can be configured to allow attachment to a user's existing garden hose via a female-threaded coupling of the garden hose segment 307 (e.g., the coupling 366) and/or via a male-threaded coupling of the garden hose segment 307 (e.g., the male coupling 302). In some aspects, the inner sleeve 330 and the outer sleeve 320 can be configured to slide along the length of the hose segment 307 to be positioned (e.g., by the user) adjacent to a selected or desired one of the female coupling end 362 or the male coupling end 302 of the hose segment 307.

In some examples, the rotation sleeve grip structure 320 can include one or more ergonomic features to provide an improved hold or grip to the user. For example, FIG. 3C illustrates an example rotation sleeve grip structure 320*c* including an ergonomic user grip enhancement comprising a handle 324, in accordance with some examples. In some aspects, the rotation sleeve grip structure 320*c* can be the same as or similar to the rotation sleeve grip structure 320 shown in FIGS. 3A and 3B, with the addition of the handle 324. The handle can be rigidly affixed to or integrally formed with the cylindrical body of the outer rotation sleeve grip structure 320*c*. For example, the handle and the cylindrical body of the rotation sleeve grip structure 320*c* can be molded as a single-piece construction. In other examples, the handle and the cylindrical body of the rotation sleeve grip structure 320*c* can be separate components that are attached using one or more couplers, adhesives, etc., to rigidly affix the handle to the outer surface of the cylindrical body of the rotation sleeve grip structure 320*c*.

In some embodiments, a braking or locking mechanism can be included to slow and/or prevent the relative rotation between the rotation sleeve grip structure and the combined inner sleeve and hose tubing (e.g., the combination of the inner sleeve affixed to the end of the hose tubing). For example, the braking or locking mechanism can engaged or disengaged selectively by a user, to thereby stop the relative rotation or enable the relative rotation (respectively) of the outer grip structure 320. In one illustrative example, the braking or locking mechanism can have a default or resting position that corresponds to a configuration where the relative rotation between the outer grip structure 320 and the inner sleeve 330 is freely permitted (e.g., absent an action from the user to engage the locking mechanism, the outer grip structure 320 can rotate freely about the circumference of the inner sleeve 330 and garden hose tubing 305/307). In other examples, the braking or locking mechanism can have a default or resting position that corresponds to a configuration where the relative rotation between the outer grip structure 320 and the inner sleeve 330 is permitted (e.g., absent an action from the user to disengage the locking mechanism, the outer grip structure 320 can be locked to the inner sleeve 330 and garden hose tubing 305/307 with the relative rotation therebetween prevented by the locking mechanism).

In some examples, the locking mechanism can be actuated (e.g., engaged, disengaged, or otherwise controlled or manipulate by the user) by a trigger, a button, a lever, etc., that is provided on the outer grip structure 320. For example, the outer grip structure 320 can include a trigger that can be pulled or actuated by the user in order to engage or disengage a locking mechanism for the relative rotation of the outer grip structure 320 about the garden hose 305/307. In other examples, the outer grip structure 320 can include a push button or spring-loaded/spring-biased lever that can be actuated by the user in order to engage or disengage a locking mechanism for the relative rotation of the outer grip structure 320 about the garden hose 305/307.

In some examples, the locking mechanism can include a trigger, button, lever, etc., that is provided on the outer surface of the rotation grip structure 320 and extends through or is other coupled to and able to control a locking element on the interior of the rotation grip structure 320 (e.g., on the interior of the rotation grip structure 320, at the interface between the rotation grip structure 320 and the inner sleeve 330 and/or the outer surface of the garden hose tubing 305/307 itself). In some aspects, the locking mechanism can be implemented based on a pad or other element with a relatively high coefficient of friction being brought into (or out of) contact with a portion of the inner sleeve 330 or garden hose tubing 305/307, in which case the relative rotation of the outer grip structure 320 is prevented based on the braking action provided by the pad (e.g., light force exerted by the user may slow but not prevent the rotation, heavier force exerted by the user can slow the rotation more rapidly and/or prevent the rotation altogether, thereby effectively locking the outer grip structure 330 in place, etc.).

In another example, the locking mechanism can be implemented based on a pin, protrusion, or other element coupled to the outer grip structure 320 being moved into (or out of) an interfering position on or within the outer surface of the inner sleeve 330. For example, the locking mechanism can be implemented as a pin or protrusion that extends radially inward from the outer grip structure 320 (e.g., based on user actuation of the button, lever, trigger, etc.) and is received in a corresponding aperture, hole, slot, opening, etc., that is recessed on the exterior surface of the inner sleeve 330. Inserting the locking pin into the receptacle or aperture on the inner sleeve 330 may lock the outer sleeve 320 to the inner sleeve 330 and prevent any relative rotation therebetween (e.g., the locking pin is moved into an interfering position that blocks the relative rotation, in order to thereby lock the outer sleeve 320 to the inner sleeve 330).

In one illustrative example, the locking mechanism can include a push button, trigger, lever, etc., that is provided on or integrated with a handle coupled to the rotation sleeve grip structure. For instance, the handle 324 shown coupled to the rotation sleeve grip structure 320 of FIG. 3C can include or be combined with a push button, trigger, lever, etc., that allows the user to control a locking mechanism to engage or disengage a locking mechanism to prevent or allow the relative rotation between the rotation sleeve 320 and the inner sleeve 330. For example, combining the handle 324 with a button design to control the locking mechanism on the relative rotation of the grip structure 320 can improve the ease of user or the user experience.

In some cases, a button design integrated with the handle 324 can be configured such that pressing the button disengages the locking mechanism to allow the garden hose tubing (e.g., tubing 307) to spin within and relative to the grip structure 320*c* when the button is pressed. For example, when uncoiling the attached garden hose, a user may grasp the handle 324 for improved control and can press the locking mechanism button to unlock the relative rotation and permit the hose to spin while being uncoiled. After uncoiling the hose, the user can release the locking mechanism button on the handle 324, to lock the handle grip structure 320 to the garden hose, thereby allowing the handle 324 to be used as a rigid contact point for better and more ergonomic control of the garden hose during use by the user.

The examples of FIGS. 3A-3C correspond to embodiments where the inner sleeve 330 and the outer sleeve 320/320*c* are each formed as continuous cylindrical bodies, which are installed by sliding over the hose end 302 and onto the garden hose 305/307.

In some embodiments, the inner sleeve 330 and/or the outer sleeve 320/320*c* can be implemented as respective two-piece designs, configured to snap together over the outer surface of the garden hose 305 or garden hose segment 307. For example, the inner sleeve 330 can be split into a first piece/portion and a second piece/portion along the longitudinal length of the inner sleeve 330. In some embodiments, the two pieces of the two-piece or snap together configuration may be identical and/or symmetrical (e.g., the inner sleeve 330 can be divided down its centerline running in the longitudinal direction). The individual pieces of the inner sleeve 330 can include snap connectors, pins, tabs, etc., at their respective edges that will form a longitudinal seam when the two pieces are assembled onto and connected together on the outer surface of the garden hose 305 or hose segment 307.

In one illustrative example, the two-piece or snap together design of the inner sleeve 330 may be utilized to allow the inner sleeve 330 to be installed onto and/or removed from existing garden hoses after manufacture and/or by the end user. For example, the snap together design can allow the inner sleeve 330 to be installed onto the outer surface of a garden hose with end fittings already present, as the inner sleeve 330 does not have to slide over the hose end fitting for installation onto or removal from the hose tubing.

In some aspects, the inner sleeve 330 can be implemented using a two-piece or snap together design, while the outer rotation sleeve grip structure 320 may be provided as a one-piece design (e.g., a continuous cylindrical body without snaps, etc.). The outer sleeve grip structure 320 can be sized with an ID that is sufficiently large to allow the single-piece outer sleeve grip structure 320 to pass or slide over the hose end fitting 302 without interference, enabling the outer sleeve grip structure 320 to be installed onto or removed from the garden hose tubing 305 or garden hose segment 307 with relative ease. Based on the outer sleeve grip structure 320 having an ID that is greater than the OD of the hose end fitting 302, the hose end fitting 302 does not prevent or constrain the longitudinal movement of the outer sleeve grip structure 320 relative to the hose tubing 305/307. In such examples, where the outer sleeve grip structure 320 is sized to slide on or off the hose 305/307 over the end fitting 302, the outer sleeve grip structure 320 can be held in position along the longitudinal axis by the inner sleeve 330.

For example, the inner sleeve 330 can be implemented as a two-piece design configured to snap together for installation onto and removal from the outer surface of the hose 305. The two-piece inner sleeve 330 can include a plurality of retention tabs the same as or similar to the retention tabs 236 of FIGS. 2A-2C, 436 of FIGS. 4A-4C, etc. The outer sleeve grip structure 320 can slide into place over the hose end fitting 302, and can include a recessed circumferential channel (e.g., the channel 425 of FIGS. 4A-4C) that engages with the retention tabs on the two-piece inner sleeve 330, to thereby constrain the longitudinal position of the outer sleeve grip structure 320 after sliding over the hose end fitting 302 during installation of the outer sleeve grip structure 320 onto the two-piece, snap-together inner sleeve 330.

In some examples, the outer sleeve 320 can be implemented using a two-piece snap together design that is the same as or similar to that described above with respect to the two-piece snap together implementation of the inner sleeve 330. In some examples, both the inner sleeve 330 and the outer grip structure 320 can be implemented as two-piece snap-together designs. In some examples, the inner sleeve 330 can be a two-piece snap together design and the outer grip structure 320 can be a single-piece construction. In some examples, the inner sleeve 330 can be a single-piece construction and the outer grip structure 320 can be a two-piece snap-together design. In such examples, the inner sleeve 330 may be permanently affixed to the outer surface of the hose 305, such that the inner sleeve 330 remains in place when the two-piece outer grip structure 320 is removed.

In some embodiments, the outer rotation sleeve grip structure (e.g., 120 of FIG. 1, 220 of FIGS. 2A-2C, 320/320*c* of FIGS. 3A-3C, 420 of FIGS. 4A-4C, etc.) can be utilized with or without the corresponding inner sleeve 130, 230, 330, 430, etc. In examples where the outer rotation sleeve grip structure is used without the corresponding inner sleeve, the rotation grip structure can be installed directly over the outer surface of the garden hose or tubing. In some cases, the outer grip structure without the inner sleeve may be able to move longitudinally along the length of the hose (e.g., as a rigid or tight fitting contact between the outer grip structure and the garden hose surface would prevent the desired relative rotation between the two). In some examples, the outer grip structure installed without the inner sleeve may be held on the hose tubing body by the end couplings (e.g., male and female couplings installed at the open ends of the hose). In some cases, the outer grip structure can be formed from various plastic or other materials selected to provide relatively low friction when brought into contact with the hose end couplings and/or a nozzle that may be attached to the hose end coupling. For example, the outer grip structure without the inner sleeve may rotate against the hose end coupling or attached nozzle. Accordingly, the selection of a relatively low friction material can improve the rotation of the outer grip structure and can increase the longevity of the outer grip structure. In some embodiments, the outer grip structure can be installed over the hose end coupling (e.g., over the male coupling 302 of FIGS. 3A-3C), and can be held in place and/or prevented from coming off of the hose tubing 305/307 based on the installation of a nozzle onto the male coupling 302 (or other hose end coupling present).

The examples described above make reference to various embodiments and implementations where the inner sleeve can include one or more retention tabs for engagement with a corresponding recessed circumferential channel on the interior of the rotation sleeve grip structure. In some aspects, the presently disclosed rotation sleeve grip assembly (e.g., comprising an outer rotation sleeve grip structure and an inner rotation sleeve) can be implemented with a rotation mechanism comprising a plurality of circumferential rib protrusions and one or more recessed grooves provided on the outer surface of the inner rotation sleeve.

Figure 5A:
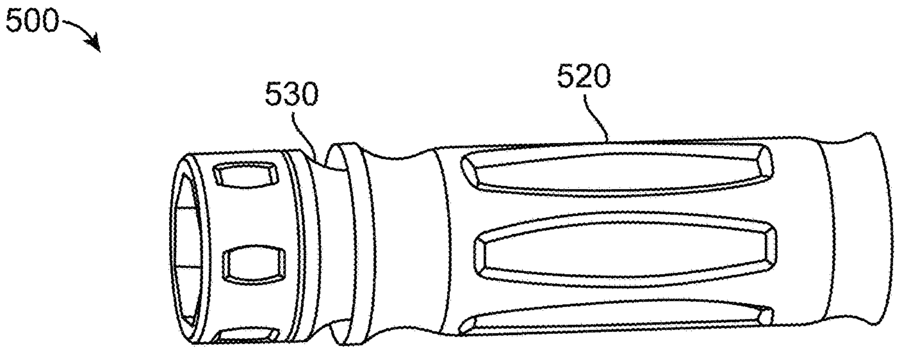
FIGS. 5A-5C depict exploded and cross-sectional views of an example rotation sleeve grip structure comprising an inner sleeve with a plurality of ribs and/or grooves and an outer rotation sleeve with corresponding circumferential channels and/or ribs configured for rotation about the inner sleeve, in accordance with some examples.
Figure 5B:
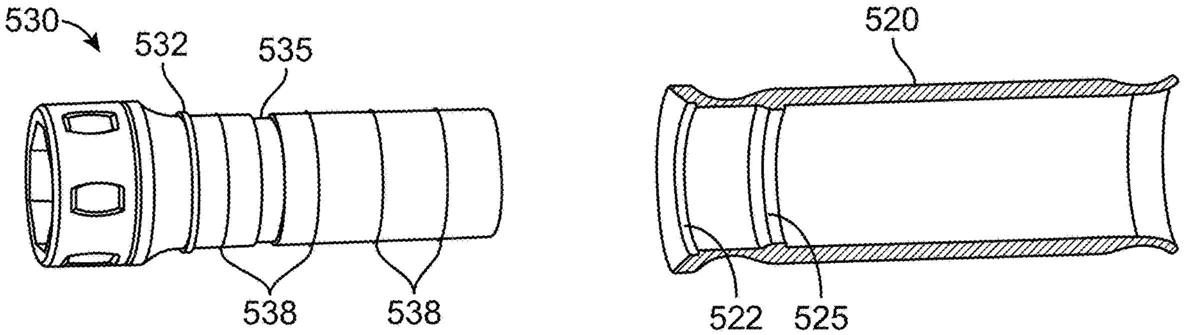
Figure 5C:
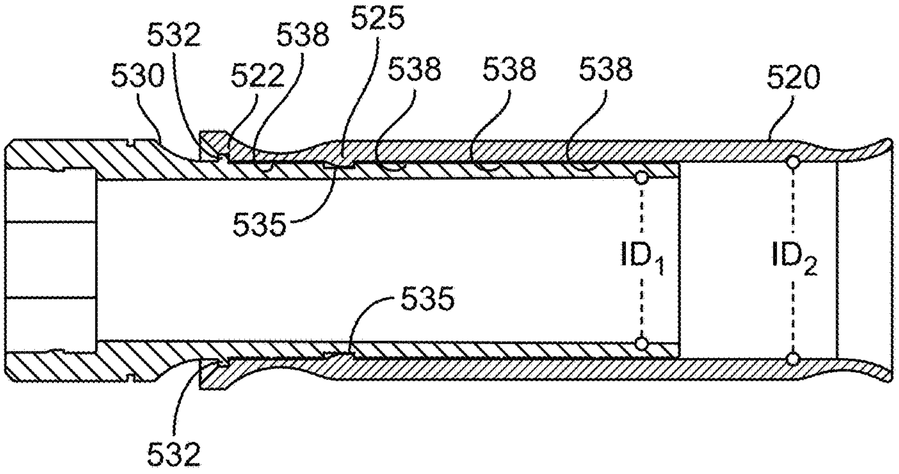

For example, FIGS. 5A-5C depict exploded and cross-sectional views of an example rotation sleeve grip assembly 500 comprising an outer rotation sleeve grip structure 520 and an inner sleeve 530, where the inner sleeve 530 includes a plurality of circumferential rib protrusions 538 (e.g., also referred to as "ribs 538") and one or more recessed circumferential grooves or channels 535.

In some aspects, the outer rotation sleeve grip structure 520 can be similar to one or more of the outer rotation sleeve grip structures 120 of FIG. 1, 220 of FIGS. 2A-2C, 320/320*c* of FIGS. 3A-3C, 420 of FIGS. 4A-4C, etc. The inner sleeve 530 can be similar to one or more of the inner sleeves 130 of FIG. 1, 230 of FIGS. 2A-2C, 330 of FIGS. 3A-3C, 430 of FIGS. 4A-4C, etc. The inner sleeve 530 can have an internal diameter $ID_1$ configured to receive a garden hose tubing, as described previously, although it is noted that a garden hose tubing is not depicted in FIGS. 5A-5C for clarity of illustration.

In one illustrative example, the plurality of circumferential rib protrusions 538 can be relatively thin and relatively short in height (e.g., where the height of a circumferential rib protrusion 538 corresponds to the radial extent of the circumferential rib protrusion 538 from the surface of the inner sleeve 530). For example, the plurality of circumferential rib protrusions 538 on the inner sleeve 530 can be configured to reduce the friction between the inner sleeve 530 and the outer grip structure 520, during relative rotation between the inner sleeve 530 and the outer grip structure 520. In particular, the plurality of circumferential rib protrusions 538 can reduce the surface area of the contact patch between the inner sleeve 530 and the outer grip structure 520 to approximately the cumulative surface area of the rib protrusions 538 themselves. Without the plurality of circumferential rib protrusions 538, the potential contact patch or contact area between the inner sleeve 530 and outer grip structure 520 could be as large as the entire outer surface of the inner sleeve 530 that overlaps with the outer grip structure 520 along the longitudinal axis. The reduced friction provided by the plurality of circumferential rib protrusions 538 can provide improved and easier relative rotation of the outer grip structure 520 and the inner sleeve 530 (and any garden hose or tubing to which the inner sleeve 530 is affixed), thereby improving the user experience and ease of operation.

In some aspects, the inner sleeve 530 and the outer grip structure 520 can be formed from like materials and/or can be formed from the same material (e.g., can have like or same material compositions). For example, the inner sleeve 530 and the outer grip structure 520 can be formed from materials that easily rotate against each other with little friction. In some embodiments, the inner sleeve 530 and the outer grip structure 520 can comprise polypropylene (PP). Various other materials and/or material compositions may also be utilized for one or more of the inner sleeve 530 and the outer grip structure 520, as well as any other inner sleeve or outer grip structure described or otherwise contemplated herein. For example, the selection of the material composition for the inner sleeve 530 and the outer grip structure 520 can be based at least in part on the friction or interaction between the two materials selected for the inner sleeve 530 and the outer grip structure 520, during the relative rotation between the inner sleeve 530 and the outer grip structure 520. For instance, the material composition of the inner sleeve 530 and the outer grip structure 520 can utilize like or same materials, or may utilize different materials, based on the friction forces or coefficient of friction between the two materials during the relative rotation between the inner sleeve 530 and outer grip structure 520 being sufficiently low. In some aspects, one or both of the inner sleeve 530 and the outer grip structure 520 may comprise a metal or may otherwise have a metallic construction, coating, layer, etc. For example, in some embodiments the inner sleeve 530 may comprise aluminum, steel, brass, etc., and the outer grip structure 520 can be a PP (among various other plastics or rubbers, etc.) material composition configured to rotate about the outer surface of the inner sleeve 530 with a relatively low coefficient of friction at the interface (e.g., contact point or contact patch(es)) between the inner sleeve 530 and outer grip structure 520.

In some aspects, the material selection for the composition and construction of the inner sleeve 530 and/or the outer grip structure 520 can be further based on durability or longevity considerations. For example, as noted previously, the relative rotation between the inner sleeve 530 and outer grip structure 520 can be implemented with one or more contact patches between various combinations of ribs, protrusions, grooves or channels, etc., that are arranged in various configurations and combinations on the exterior surface of the inner sleeve 530 and the interior surface of the outer grip structure 520 (e.g., as shown in the various cross-sectional views of FIGS. 4A-6C). Some material pairs may have relatively low coefficients of friction between themselves, but may also have relatively low durability, causing the inner sleeve 530, the outer grip structure 520, or both, to degrade or otherwise experience relatively low (e.g., short) longevity as a result of the repeated contact between the two surfaces during the relative rotation of inner sleeve 530 and outer grip structure 520. For example, various combinations of material pairs may have a longevity or lifespan (e.g., expected number of rotations, etc.) that is lower than that of different combinations of material pairs. In some aspects, the material composition of the inner sleeve 530 and the outer grip structure 520 can be selected based on both the friction between the two materials as the inner sleeve 530 and outer grip structure 520 undergo their relative rotation, and may further be selected based on the durability or longevity of the two materials as they undergo the relative rotation.

The inner sleeve 530 can include a recessed circumferential channel 535 that is recessed from the surface of the inner sleeve 530, and configured to receive a corresponding protrusion 525 extending from the interior surface of the rotation sleeve grip structure 520. The recessed circumferential channel 535 provided on the inner sleeve 530 can be similar to the recessed circumferential channel 425 provided on the interior of the rotation sleeve grip structure 420 illustrated in FIGS. 4A-4C.

The circumferential protrusion 525 of the rotation sleeve grip structure 520 can be configured to engage with and extend into the recessed circumferential channel 535 of the inner sleeve 530, in a manner the same as or similar to the interaction between the retention tabs 425 and channel 425 described previously above with respect to FIGS. 4A-4C. For example, the circumferential protrusion 525 can be received within the recessed circumferential channel 535, to thereby permit the 360-degree relative rotation between the inner sleeve 530 and outer grip structure 520, while preventing or restraining relative longitudinal movement between the inner sleeve 530 and the outer grip structure 520.

In some aspects, the inner sleeve 530 can further include a circumferential reference protrusion 532, extending from the surface of the inner sleeve 530 in the radial direction. The circumferential reference protrusion 532 can be configured to provide a reference line for assembly of the outer grip structure 520 onto the inner sleeve 530. For example, a desired or configured alignment between the inner sleeve 530 and the outer grip structure 520 can be provided based on aligning the circumferential reference protrusion 532 on the inner sleeve 530 with a corresponding recessed channel 522 on the interior surface of the outer grip structure 520 (e.g., as seen in the cross-sectional view of FIG. 5C).

Figure 6A:
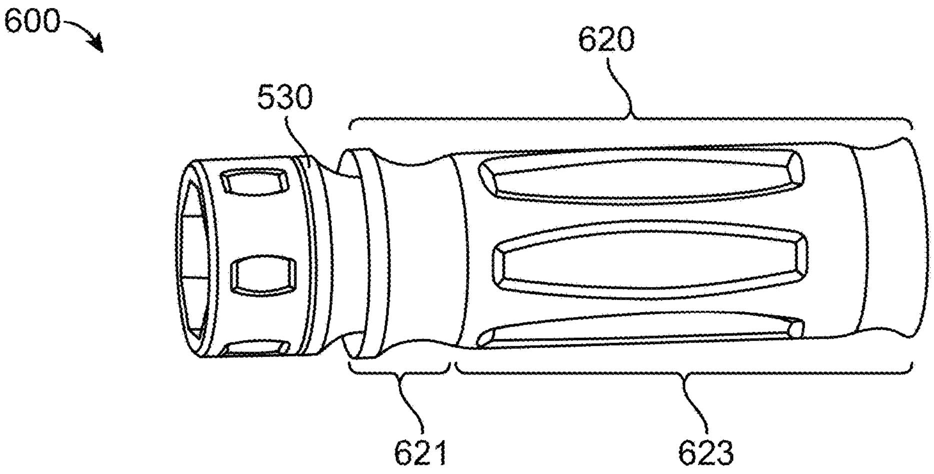
FIGS. 6A-6C depict views of an example rotation sleeve grip structure comprising the inner sleeve of FIGS. 5A-5C and an outer rotation sleeve having a first base layer and a second overmolded grip layer, in accordance with some examples.
Figure 6B:
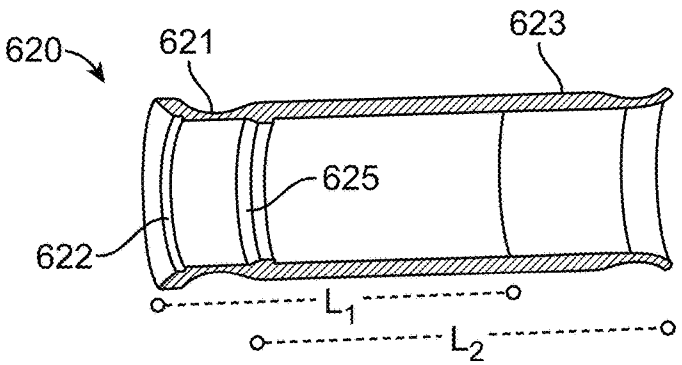
Figure 6C:
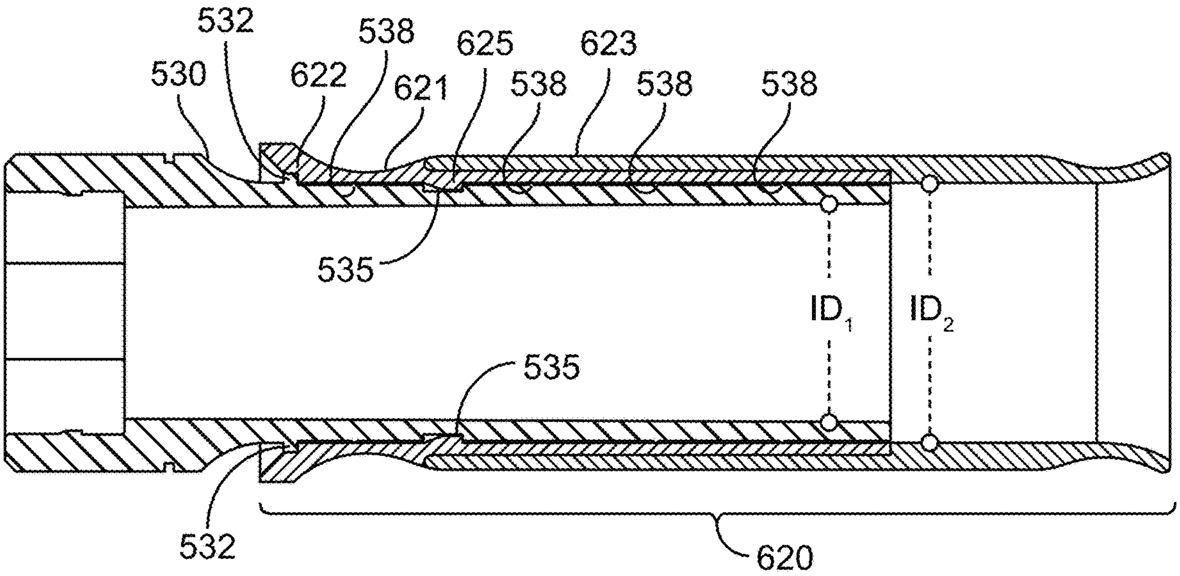

As noted above, in some embodiments the inner sleeve 530 and the outer grip structure 520 can be formed from like, similar, or same materials (to reduce friction therebetween). For instance, in some cases the inner sleeve 530 and the outer grip structure 520 may both comprise polypropylene (PP). In some embodiments, the outer grip structure can comprise a multi-material (e.g., multi-layer, etc.) design. For instance, FIGS. 6A-6C depict views of an example rotation sleeve grip assembly 600 comprising the inner sleeve 530 of FIGS. 5A-5C and an outer rotation sleeve 620 having a first base layer and a second overmolded grip layer, in accordance with some examples.

For example, the outer grip structure 620 can comprise the outer grip structure 520 of FIG. 5, with an overmolded grip layer 623 on top of a base layer 621. In some aspects, the base layer 621 of the outer grip structure 620 can comprise the same material composition as the inner sleeve 530. For example, the base layer 621 and the inner sleeve 530 can be formed from polypropylene (PP), etc. The overmolded grip layer 623 can comprise a differential material from the base layer 621 and/or the inner sleeve 530. For example, the overmolded grip layer 623 can be a soft-touch material, and in one illustrative example is implemented as a TPR overmold layer disposed on top of the base layer 621 of the outer grip structure 620.

The base layer 621 of the outer grip structure 620 can extend a first longitudinal length $L_1$, where $L_1$ is less than or equal to the total longitudinal length of the outer grip structure 620. The overmolded grip layer 623 can extend a second longitudinal length $L_2$, which is at least partially overlapping with the base layer 621 of length $L_1$ (e.g., as illustrated in FIG. 6B). In some aspects, the outer grip structure 620 can include a recessed circumferential channel 622 that is the same as or similar to the recessed circumferential channel 522 of FIGS. 5A-5C. The outer grip structure 620 can additionally include a circumferential protrusion 625 extending radially outward from the interior surface of the outer grip structure 620, where the circumferential protrusion 625 is the same as or similar to the circumferential protrusion 525 of FIGS. 5A-5C. In some embodiments, the recessed circumferential channel 622 and the circumferential protrusion 625 can both be provided on an interior surface of the base layer 621 of the outer grip structure 620.

These and other embodiments of the invention will be apparent to the skilled person and the invention is not limited to the foregoing examples.

What is claimed is:

1. A hose assembly comprising:

a hose tubing having first and second open ends; and a rotation sleeve installed over an outer surface of the hose tubing, wherein the rotation sleeve is constrained between at least the first and second open ends of the hose tubing and comprises a hollow cylindrical shell configured to enclose a portion of the hose tubing along a longitudinal length thereof, and wherein the rotation sleeve is rotatable through 360 degrees about a circumference of the outer surface of the hose tubing, the rotation sleeve including:

a base layer forming the hollow cylindrical shell configured to enclose the portion of the hose tubing; and an overmolded layer disposed on an outer surface of at least a portion of the base layer, wherein the overmolded layer comprises a thermoplastic rubber (TPR) material or a soft-touch overmold material.

2. The hose assembly of claim 1, further comprising:

an inner sleeve disposed between the outer surface of the hose tubing and an interior surface of the rotation sleeve, wherein the inner sleeve is attached to a corresponding portion of the outer surface of the hose tubing along the longitudinal length.

3. The hose assembly of claim 2, wherein the inner sleeve is rigidly coupled or bonded to the corresponding portion of the outer surface of the hose tubing, and wherein the rotation sleeve is rotatable through 360 degrees relative to the inner sleeve and the hose tubing.

4. The hose assembly of claim 2, wherein:

the inner sleeve includes one or more retention tabs spaced about a circumference of an outer surface of the inner sleeve, each respective retention tab of the one or more retention tabs including a radial protrusion at a distal end of the respective retention tab; and the rotation sleeve includes a circumferential channel configured to receive the radial protrusion of each respective retention tab of the one or more retention tabs to longitudinally constrain movement of the rotation sleeve relative to the inner sleeve, wherein the circumferential channel is recessed from an interior surface of the rotation sleeve.

5. The hose assembly of claim 4, wherein the rotation sleeve is rotatable through 360 degrees based on travel of the radial protrusion of each respective retention tab of the one or more retention tabs within the circumferential channel of the interior surface of the rotation sleeve.

6. The hose assembly of claim 2, wherein:

the inner sleeve includes a plurality of circumferential rib protrusions each extending from an outer surface of the inner sleeve; and the inner sleeve includes a recessed circumferential channel recessed from the outer surface of the inner sleeve, wherein a width of the recessed circumferential channel is greater than a width associated with each circumferential rib protrusion of the plurality of circumferential rib protrusions, and wherein the recessed circumferential channel is configured to receive a corresponding circumferential protrusion extending from an interior surface of the rotation sleeve.

7. The hose assembly of claim 6, wherein:

the rotation sleeve is coupled to the inner sleeve and constrained from movement in a longitudinal direction based on the circumferential protrusion of the rotation sleeve interior surface being received within the recessed circumferential channel of the inner sleeve.

8. The hose assembly of claim 6, wherein the rotation sleeve is rotatable through 360 degrees relative to the inner sleeve and the hose tubing based on the circumferential protrusion being received within the recessed circumferential channel.

9. The hose assembly of claim 6, wherein a surface area of a contact patch between the outer surface of the inner sleeve, and the interior surface of the rotation sleeve corresponds to a combined area of the plurality of circumferential rib protrusions.

10. The hose assembly of claim 6, wherein:

the inner sleeve further includes a reference protrusion extending from the outer surface along a circumference of the inner sleeve; and the reference protrusion is located at a longitudinal location configured to align the inner sleeve relative to the rotation sleeve based on the reference protrusion being received within a corresponding channel on the interior surface of the rotation sleeve.

11. The hose assembly of claim 6, wherein the recessed circumferential channel of the inner sleeve is located between first and second circumferential rib protrusions included in the plurality of circumferential rib protrusions.

12. The hose assembly of claim 2, wherein:

an inner diameter (ID) of the inner sleeve is greater than or equal to an outer diameter (OD) of the hose tubing; and a second ID of the rotation sleeve is greater than or equal to a second OD of the inner sleeve.

13. The hose assembly of claim 1, wherein the base layer of the rotation sleeve comprises polypropylene.

14. The hose assembly of claim 1, wherein the overmolded layer of the rotation sleeve comprises a grip structure configured with one or more grip elements for handheld use of the hose assembly by a user.

15. The hose assembly of claim 1, wherein the rotation sleeve further includes one or more handles coupled to and extending from an outer surface of the hollow cylindrical shell of the rotation sleeve.

16. The hose assembly of claim 1, wherein:

the hose tubing comprises a segment of hose tubing having a first length between a male coupling provided at the first open end and a female coupling provided at the second open end;

the rotation sleeve is installed over an outer surface of the segment of hose tubing and longitudinally constrained between the male coupling and the female coupling; and the hose assembly further includes a second length of hose tubing attached to the segment of hose tubing using one of the male coupling or the female coupling of the segment of hose tubing.

17. The hose assembly of claim 16, wherein the second length of hose tubing is longer than the first length of the segment of hose tubing.

18. The hose assembly of claim 17, wherein the first length is less than 12 inches, and wherein the second length is greater than 20 feet.

19. The hose assembly of claim 1, wherein:

the rotation sleeve has a circular cross section and comprises a first portion and a second portion detachably coupled along a longitudinal length of the rotation sleeve; and the first portion and the second portion of the rotation sleeve each have a respective semi-circular cross section, where a semi-circular cross-sectional area of the first portion is equal to a semi-circular cross-sectional area of the second portion.

* * * * *